(12) United States Patent
Pierson et al.

(10) Patent No.: US 9,372,808 B2
(45) Date of Patent: Jun. 21, 2016

(54) DEADLOCK-AVOIDING COHERENT SYSTEM ON CHIP INTERCONNECT

(71) Applicant: Texas Instruments Incorporated, Dallas, TX (US)

(72) Inventors: Matthew D Pierson, Murphy, TX (US); Daniel B Wu, Dallas, TX (US); Kai Chirca, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 192 days.

(21) Appl. No.: 14/059,732

(22) Filed: Oct. 22, 2013

(65) Prior Publication Data

US 2014/0115272 A1    Apr. 24, 2014

Related U.S. Application Data

(60) Provisional application No. 61/717,872, filed on Oct. 24, 2012.

(51) Int. Cl.
| | |
|---|---|
| G06F 12/08 | (2006.01) |
| G06F 12/10 | (2016.01) |
| G06F 13/16 | (2006.01) |
| H04L 29/06 | (2006.01) |
| G06F 13/42 | (2006.01) |
| G06F 13/28 | (2006.01) |
| G06F 13/40 | (2006.01) |

(52) U.S. Cl.
CPC ........ *G06F 12/1081* (2013.01); *G06F 12/0815* (2013.01); *G06F 12/0828* (2013.01); *G06F 12/0831* (2013.01); *G06F 12/0835* (2013.01); *G06F 13/1626* (2013.01); *G06F 13/1663* (2013.01); *G06F 13/287* (2013.01); *G06F 13/4022* (2013.01); *G06F 13/42* (2013.01); *H04L 63/0263* (2013.01); *G06F 2212/621* (2013.01); *Y02B 60/1225* (2013.01)

(58) Field of Classification Search
CPC .................................................. G06F 12/0831
See application file for complete search history.

(56) References Cited

U.S. PATENT DOCUMENTS

| | | | | |
|---|---|---|---|---|
| 6,560,675 | B1 * | 5/2003 | Aho et al. | 711/118 |
| 2007/0055827 | A1 * | 3/2007 | Tsien | 711/141 |
| 2014/0040561 | A1 * | 2/2014 | Lih et al. | 711/135 |

* cited by examiner

*Primary Examiner* — Ryan Bertram
*Assistant Examiner* — Trang Ta
(74) *Attorney, Agent, or Firm* — Robert D. Marshall, Jr.; Frank D. Cimino

(57) ABSTRACT

This invention mitigates these deadlocking issues by a adding a separate non-blocking pipeline for snoop returns. This separate pipeline would not be blocked behind coherent requests. This invention also repartitions the master initiated traffic to move cache evictions (both with and without data) and non-coherent writes to the new non-blocking channel. This non-blocking pipeline removes the need for any coherent requests to complete before the snoop request can reach the memory controller. Repartitioning cache initiated evictions to the non-blocking pipeline prevents deadlock when snoop and eviction occur concurrently. The non-blocking channel of this invention combines snoop responses from memory controller initiated requests and master initiated evictions/non-coherent writes.

3 Claims, 7 Drawing Sheets

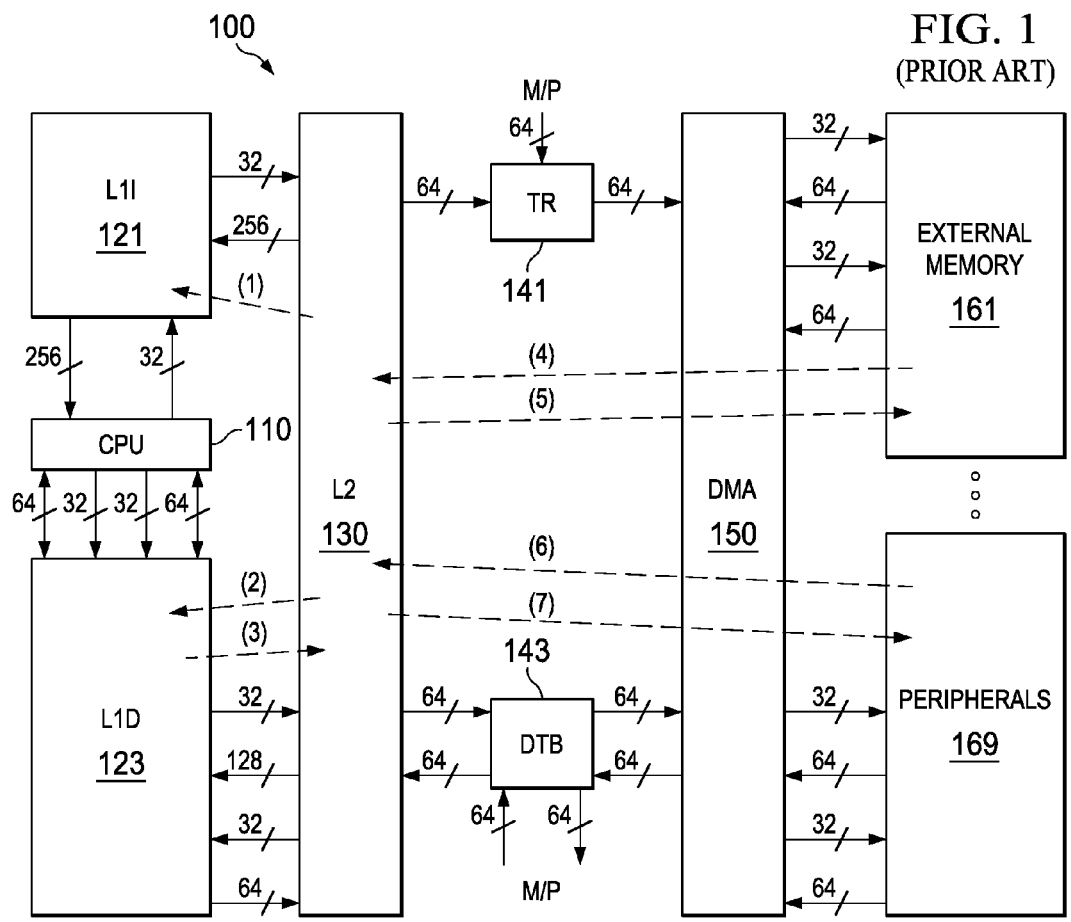
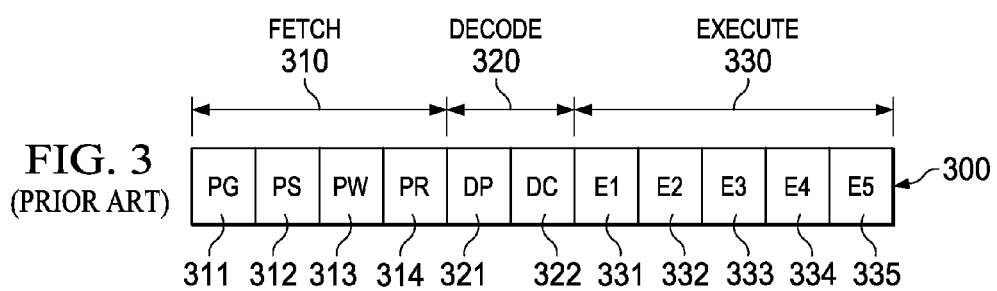

| 31 ∘∘∘ 29 | 28 | 27 ∘∘∘ 23 | 22 ∘∘∘ 18 | 17 ∘∘∘ 13 | 12 ∘∘∘ 2 | 1 | 0 |
|---|---|---|---|---|---|---|---|
| creg | z | dst | src2 | scr1/cst | opcode | s | p |

DEADLOCK-AVOIDING COHERENT SYSTEM ON CHIP INTERCONNECT

CLAIM OF PRIORITY

This application claims priority under 35 U.S.C. 119(e)(1) to U.S. Provisional Application No. 61/717,872 filed Oct. 24, 2012.

TECHNICAL FIELD OF THE INVENTION

The technical field of this invention is cache for digital data processors.

BACKGROUND OF THE INVENTION

This invention is applicable to data processing systems with multi-level memory where the second level (L2) memory used for both unified (code and instructions) level two cache and flat (L2 SRAM) memory used to hold critical data and instructions. The second level memory (L2) is used for multiple purposes including unified instruction and data level two cache, directly addressable SRAM memory used to hold critical data and code accessible by both external and internal direct memory access (DMA) units.

When the level one data cache controller is granted access to the level one data cache, this access could force an existing line to be evicted. The CPU can also force the level one data cache to evict lines though the block writeback operation. At the same time, the level two cache could be receiving a DMA access to the same line. This situation could break coherency, if DMA data were committed incorrectly. This could occur by writing to the level two memory then overwriting that data with the level one cache victim. This could also occur by sending the DMA data as a snoop write to the level one data cache. This forces the level one data cache to write the DMA data to its cache after the victim has been evicted. This effectively, drops the DMA write. Thus when a victim is in progress, a DMA write sent as snoop could miss the victim.

Cached coherent memory systems must enforce an in-order pipeline to maintain coherence across all coherent master caches and coherent memory endpoints. A typical non-coherent memory request pipeline includes: Command (Read or Write) Bus; Write Data Bus; Read Data Bus; and Write Status Bus. To maintain coherence the memory controller needs to be able to request the latest data for a memory location from a master cache via either forced eviction or a non-evicting data update. Once this new data gets to the memory controller, it can be committed when any subsequent coherent memory access can commit. If the snoop returns travel along the same busses above they can be blocked by other possibly coherent requests. If the memory controller stalls coherent requests to wait for a snoop return and the snoop return is stuck behind coherent memory requests, the pipeline is deadlocked.

In the most difficult scenario the master cache has begun evicting a cache line and subsequently receives a snoop request to the same line. In this invention the master cache waits for the eviction to complete before responding to the snoop. Under these conditions it is critical that the victim not also be blocked by coherent requests.

SUMMARY OF THE INVENTION

This invention mitigates these deadlocking issues by a adding a separate non-blocking pipeline for snoop returns. This separate pipeline would not be blocked behind coherent requests. This invention also repartitions the master initiated traffic to move cache evictions (both with and without data) and non-coherent writes to the new non-blocking channel.

Adding a non-blocking pipeline removes the need for any coherent requests to complete before the snoop request can reach the memory controller. Repartitioning cache initiated evictions to the non-blocking pipeline prevents deadlock when snoop and eviction occur concurrently. The non-blocking channel of this invention combines snoop responses from memory controller initiated requests and master initiated evictions/non-coherent writes.

This non-blocking pipeline provides a correct by construction removal of dependencies between coherent requests (reads/writes) and the subsequent cache maintenance requests (snoops/victims) needed to complete coherent requests. This eliminates the need for a third bus to handle master initiated evictions to prevent them from being stuck behind coherent master initiated requests. This invention simplifies hazarding rules in the master to avoid deadlocks without the need of a third bus.

BRIEF DESCRIPTION OF THE DRAWINGS

These and other aspects of this invention are illustrated in the drawings, in which:

FIG. 1 illustrates the organization of a typical digital signal processor to which this invention is applicable (prior art);

FIG. 3 illustrates the pipeline stages of the very long instruction word digital signal processor core illustrated in FIG. 2 (prior art);

DETAILED DESCRIPTION OF PREFERRED EMBODIMENTS

Figure 2:
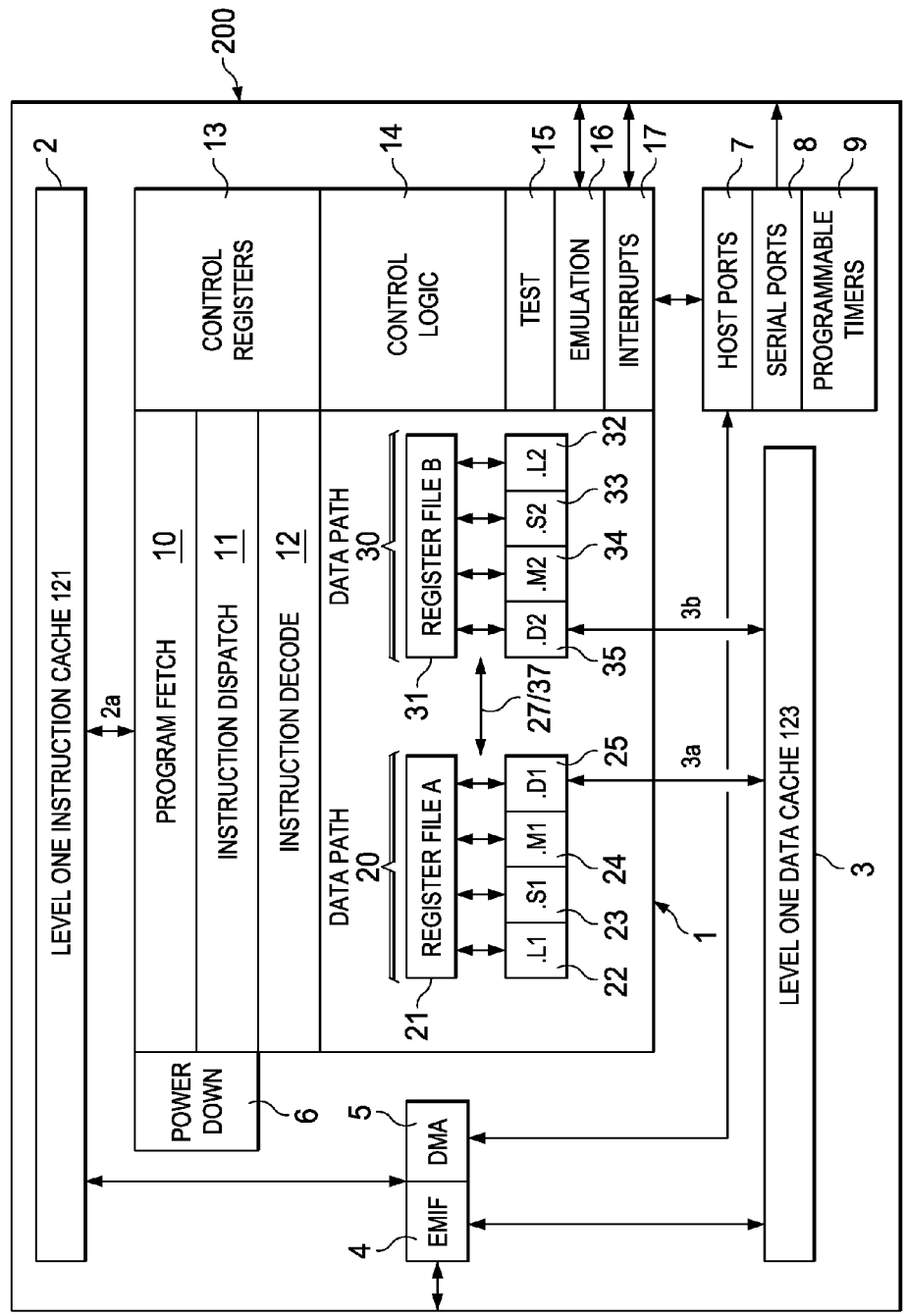
FIG. 2 illustrates details of a very long instruction word digital signal processor core suitable for use in FIG. 1 (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically include a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

FIG. 1 illustrates several data/instruction movements within the digital signal processor system 100. These include: (1) instructions move from L2 cache 130 to L1I cache 121 to fill in response to a L1I cache miss; (2) data moves from L2 cache 130 to L1D cache 123 to fill in response to a L1D cache miss; (3) data moves from L1D cache 123 to L2 cache 130 in response to a write miss in L1D cache 123, in response to a L1D cache 123 victim eviction and in response to a snoop from L2 cache 130; (4) data moves from external memory 161 to L2 cache 130 to fill in response to L2 cache miss or a direct memory access (DMA) data transfer into L2 cache 130; (5) data moves from L2 cache 130 to external memory 161 in response to a L2 cache victim eviction or writeback and in response to a DMA transfer out of L2 cache 130; (6) data moves from peripherals 169 to L2 cache 130 in response to a DMA transfer into L2 cache 130; and (7) data moves from L2 cache 130 to peripherals 169 is response to a DMA transfer out of L2 cache 130.

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level one instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs simultaneously in each of the two data paths 20 and 30. As previously described each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16 by 16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extension instructions, the results are written to a register file. Multiply extension instructions complete during the E4 phase 334.

During E5 phase 335, load instructions write data into a register. Load instructions complete during the E5 phase 335.

Figures 4, 5:
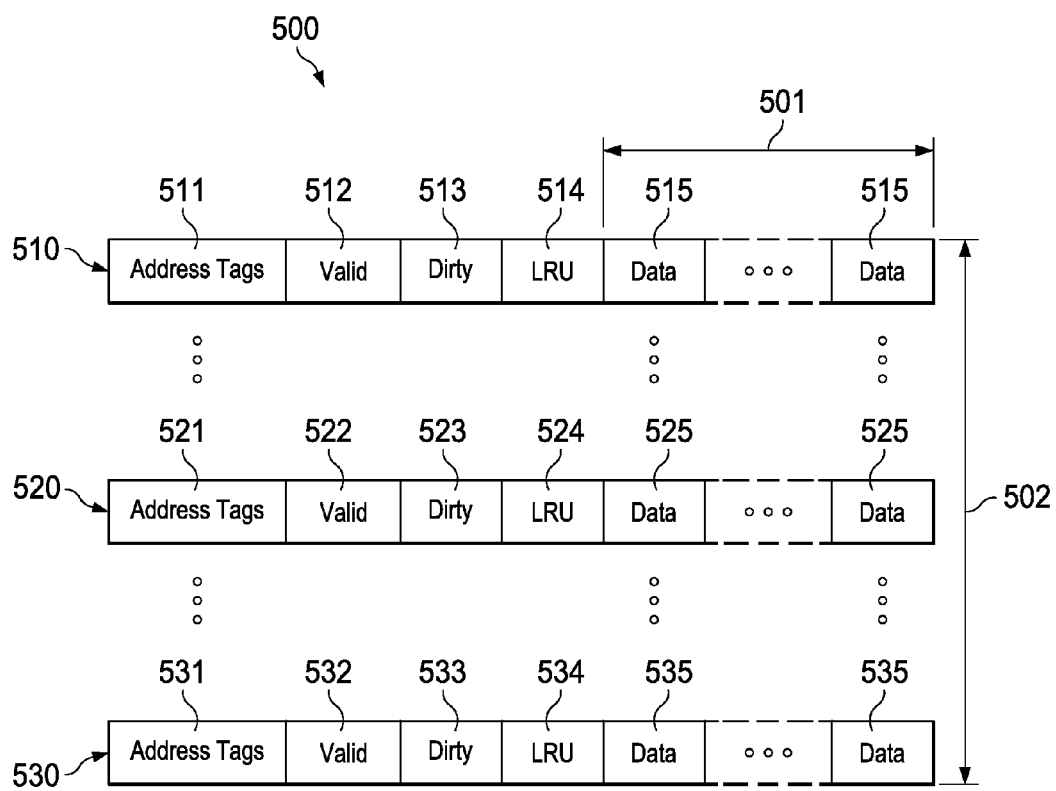
FIG. 4 illustrates the instruction syntax of the very long instruction word digital signal processor core illustrated in FIG. 2 (prior art)
FIG. 5 illustrates the details of a set of typical prior art cache lines (prior art)

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional | creg | | | z |
|---|---|---|---|---|
| Register | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

FIG. 5 illustrates the details of plural cache lines such as used in L1I cache 121, L1D cache 123 and L2 cache 130 illustrated in FIG. 1. Cache 500 illustrated in FIG. 5 includes cache lines 510, 520 and 520 that are representative of the internal structure of cache 500. Each of cache lines 510, 520 and 530 includes: respective address tags 511, 521 and 522; respective valid bits 512, 522 and 523; respective dirty bits 513, 523 and 533; respective least recently used (LRU) indicators 514, 524 and 534; and respective data words 515, 525 and 535. Each cache line 510, 520 and 530 includes plural respective data words 515, 525 and 535. The bit length of data words 515, 525 and 535 is set by the minimal addressable data amount of CPU 110. This is typically 8 bits/1 byte.

Cache 500 stores data from more distant memories such as external memory 161 which are accessed by a multi-bit address. Cache 500 is organized to facilitate this storage and to facilitate finding such data in the cache. Each cache line 510, 520 and 530 typically stores $2^N$ respective data words 515, 525 and 535, when N is an integer. The position of data words 515, 525 and 535 within the corresponding cache line 510, 520 and 530 along the dimension 501 serves as a proxy for the least significant bits of the address.

The position of cached data within lines along dimension 502 serves as a proxy for the next most significant bits of the address. The corresponding address tags 511, 521 and 531 form the remainder of the data word address. To determine if a memory access is to data cached within cache 500 (a cache hit), cache 500 compares the address tags for all cache lines to the most significant bits of the memory location accessed.

Upon a detecting a match, the position within the cache line along dimension 501 corresponds to the least significant bits of the address permitting identification of the data word accessed.

Each cache line 510, 520 and 530 includes a corresponding valid bit 512, 522 and 532. A first state of this valid bit indicates the corresponding data words 515, 525 or 535 are valid. An opposite state of this valid bit indicates the corresponding data words 515, 525 or 535 are not valid. There are several instances where data stored within cache 500 would not be valid. Upon initial activation of digital signal processor system 100 the L1I cache 121, L1D 123 cache and L2 cache 130 would not be loaded. Thus they would not store valid data. Accordingly, all cache lines are initially marked invalid. During a cache access a match of a requested address with address tags 511, 521 or 531 would not detect a match unless the corresponding valid bit 512, 522 or 532 indicated the data was valid.

Each cache line 510, 520 and 530 includes a corresponding dirty bit 513, 523 and 533. A first state of this valid bit indicates the corresponding data words 515, 525 or 535 are dirty. An opposite state of this valid bit indicates the corresponding data words 515, 525 or 535 are not dirty (clean). Cache memory is generally used for both read accesses and write accesses. Upon a cache hit for a write access, the write data is written into the corresponding location within cache 500. According to the preferred writeback technique, this write data is not immediately forwarded to external memory 161. Instead the respective dirty bit 513, 523 or 533 is set to indicate dirty. A dirty indication means that there has been a write to the cached data not currently reflected in the base memory. According to the writeback technique this data is written to the base memory with the expectation that this writeback can accumulate plural writes to the memory location and nearby memory locations within the same cache line to reduce traffic on the bus to external memory 161.

The least recently used (LRU) bits 514, 524 and 534 are used when a cache line is replaced. Because the cache cannot hold all the data stored in the large, slow memory, the data within the cache must be replaced with new data regularly. Using a data words location within dimensions 501 and 502 as proxy for the least significant bits introduces a problem in locating data within cache 500. If there is only a single cache line having the same location on dimensions 501 and 502, then plural data from the large, slow memory will alias to the same cache line in cache 500. This is data having the same least significant address bits corresponding to dimensions 501 and 502 but differing most significant address bits. An access to such aliased data would require the previous data at that cache line to be replaced. This is considered disadvantageous. A typical prior art cache is set associative. Thus a set of cache lines have the same location on dimensions 501 and 502. Typical sets include two members (two-way set associative) or four members (four-way set associative). Each cache line of such a set is called a way. A cache miss to an address that aliases to one of these sets needs only to evict one of these ways. Determination of which way to evict is typically made based on prior usage of these ways. According to both the temporal and spatial locality principles more recently used cache ways are more likely to be reused than less recently used cache ways. LRU bits 514, 524 and 534 track accesses to cache ways within the set. When data is to be replaced the LRU bits indicate the least recently used way for replacement. Maintaining cache coherence requires writeback of a dirty way upon such replacement.

Figure 6:
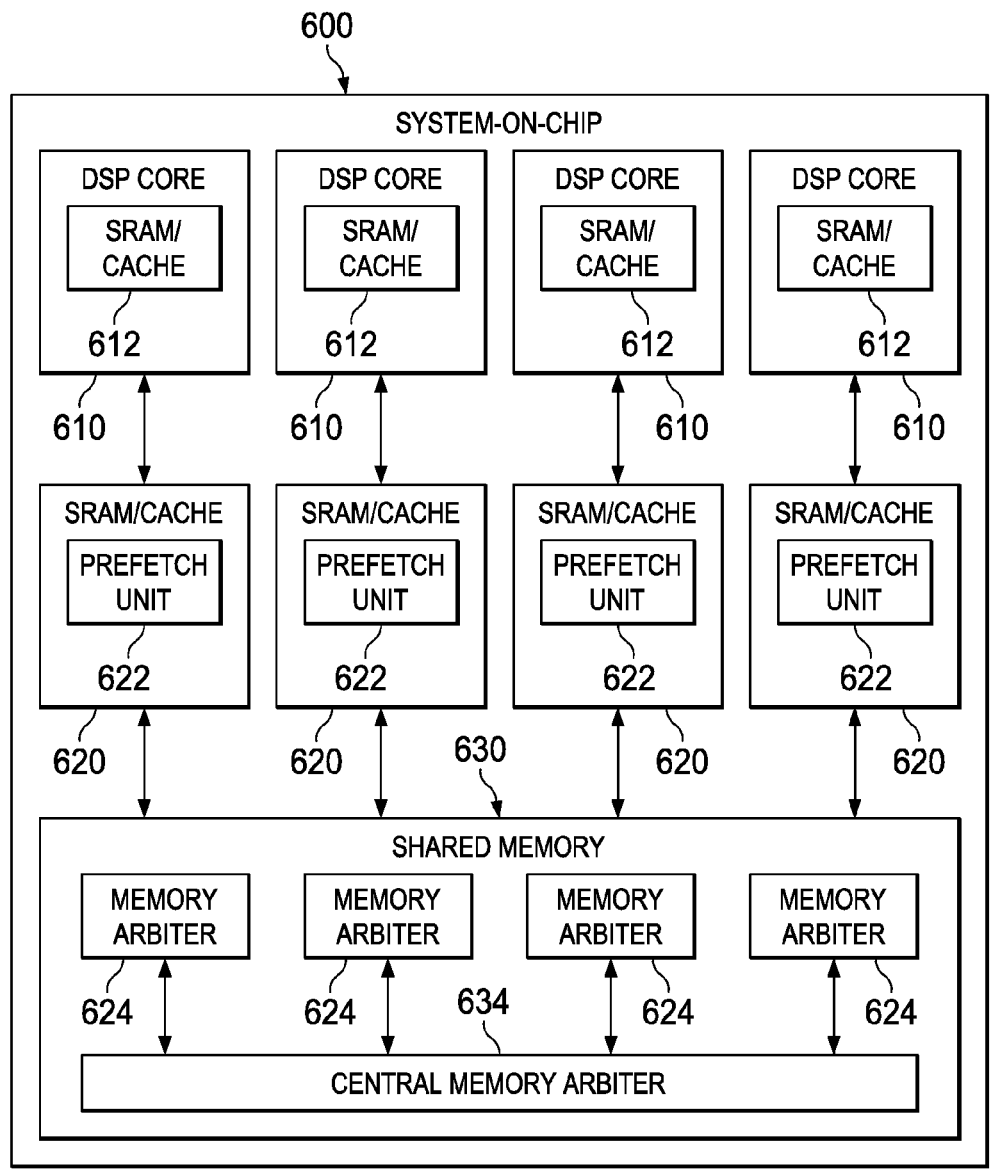
FIG. 6 illustrates a computing system including a local memory arbiter according to an embodiment of the invention.

FIG. 6 is a block diagram illustrating a computing system including a local memory arbiter according to an embodiment of the invention. FIG. 6 illustrates system on a chip (SoC) 600. SoC 600 includes one or more DSP cores 610, SRAM/Caches 620 and shared memory 630. SoC 600 is preferably formed on a common semiconductor substrate. These elements can also be implemented in separate substrates, circuit boards and packages. For example shared memory 630 could be implemented in a separate semiconductor substrate. FIG. 6 illustrates four DSP cores 610, but SoC 600 may include fewer or more DSP cores 610.

Each DSP core 610 preferably includes a level one data cache such as L1 SRAM/cache 612. In the preferred embodiment each L1 SRAM/cache 612 may be configured with selected amounts of memory directly accessible by the corresponding DSP core 610 (SRAM) and data cache. Each DSP core 610 has a corresponding level two combined cache L2 SRAM/cache 620. As with L1 SRAM/cache 612, each L2 SRAM/cache 620 is preferably configurable with selected amounts of directly accessible memory (SRAM) and data cache. Each L2 SRAM/cache 620 includes a prefetch unit 622. Each prefetch unit 622 prefetchs data for the corresponding L2 SRAM/cache 620 based upon anticipating the needs of the corresponding DSP core 610. Each DSP core 610 is further coupled to shared memory 630. Shared memory 630 is usually slower and typically less expensive memory than L2 SRAM/cache 620 or L1 SRAM/cache 612. Shared memory 630 typically stores program and data information shared between the DSP cores 610.

In various embodiments, each DSP core 610 includes a corresponding local memory arbiter 624 for reordering memory commands in accordance with a set of reordering rules. Each local memory arbiter 624 arbitrates and schedules memory requests from differing streams at a local level before sending the memory requests to central memory arbiter 634. A local memory arbiter 624 may arbitrate between more than one DSP core 610. Central memory arbiter 634 controls memory accesses for shared memory 630 that are generated by differing DSP cores 610 that do not share a common local memory arbiter 624.

Figure 7:
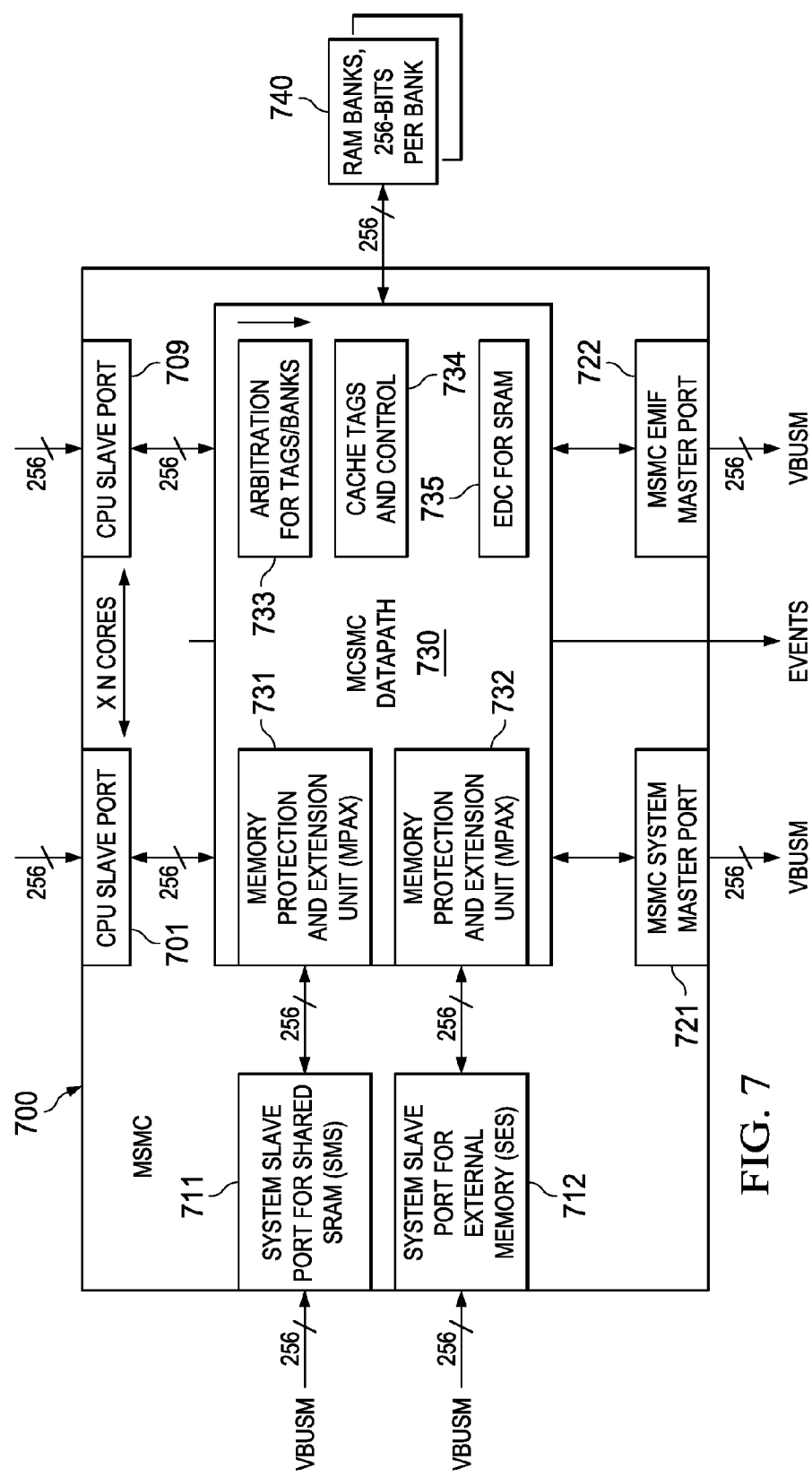
FIG. 7 illustrates a preferred embodiment of the multi-core memory system controller of this invention.

FIG. 7 illustrates a preferred embodiment of the multi-core memory controller of this invention. Multi-core shared memory controller (MSMC) 700 includes; plural slave interfaces for CPU cores 701 to 709; two full VBusM slave interfaces for connections to the SoC interconnect, a first system slave port for shared SRAM (SMS) 711 and a second system slave port for external SRAM (SES) 712; MSMC system master port 721; MSMC external memory interface (EMIF) 722; and MSMC master control data path 730. MSMC master control data path 730 includes: memory protection and extension unit (MPAX) 731 coupled to system slave port for shared SRAM (SMS) 711; and memory protection and extension unit (MPAX) 732 coupled to system slave port for external memory (SES) 712. MSMC master control data path 730 includes: arbitration for tags/banks 733; cache tags and control 734; and error detection and correction (EDC) 735. MSMC master control data path 730 is bidirectionally coupled to RAM banks 740. MSMC 700 controls communication between plural processing cores, external peripherals and memory. In particular MSMC 700 controls memory operations to maintain coherence when plural processing cores employ the same shared memory.

Cached coherent memory systems must enforce an in-order pipeline to maintain coherence across all coherent master caches and coherent memory endpoints. A typical non-coherent memory request pipeline includes: Command (Read or Write) Bus; Write Data Bus; Read Data Bus; and Write Status Bus. To maintain coherence the memory controller needs to be able to request the latest data for a memory location from a master cache via either forced eviction or a non-evicting data update. Once this new data gets to the memory controller, it can be committed when any subsequent coherent memory access can commit. If the snoop returns travel along the same busses above they can be blocked by other possibly coherent requests. If the memory controller stalls coherent requests to wait for a snoop return and the snoop return is stuck behind coherent memory requests, the pipeline is deadlocked.

In the most difficult scenario the master cache has begun evicting a cache line and subsequently receives a snoop request to the same line. In this invention the master cache waits for the eviction to complete before responding to the snoop. Under these conditions it is critical that the victim not also be blocked by coherent requests.

This invention mitigates these deadlocking issues by a adding a separate non-blocking pipeline for snoop returns. This separate pipeline would not be blocked behind coherent requests. This invention also repartitions the master initiated traffic to move cache evictions (both with and without data) and non-coherent writes to the new non-blocking channel.

Adding a non-blocking pipeline removes the need for any coherent requests to complete before the snoop request can reach the memory controller. Repartitioning cache initiated evictions to the non-blocking pipeline prevents deadlock when snoop and eviction occur concurrently. The non-blocking channel of this invention combines snoop responses from memory controller initiated requests and master initiated evictions/non-coherent writes.

This non-blocking pipeline provides a correct by construction removal of dependencies between coherent requests (reads/writes) and the subsequent cache maintenance requests (snoops/victims) needed to complete coherent requests. This eliminates the need for a third bus to handle master initiated evictions to prevent them from being stuck behind coherent master initiated requests. This invention simplifies hazarding rules in the master to avoid deadlocks without the need of a third bus.

Known processing core coherency protocols require separate channels for read and write transactions to prevent system deadlock scenarios. In some processing cores of this type read and write transactions can require snooping other coherent masters. If a Coherent Master performs a WriteUnique or a ReadUnique to a cache line it does not own, then the multi-core shared memory controller (MSMC) 700 may need to snoop the other coherent masters to retrieve the latest copy of that cache line. In the event that a coherent master issues a writeback of the cache line before receiving a snoop request for that cache line, it is known in the prior art that coherent master to wait for the completion of that writeback to memory before responding to the snoop request. A memory writeback from a coherent master must never be stalled by any snooping requests. Thus in the known art a coherent master (which is presumed to own the cache line) cannot issue a memory update writeback alongside other coherent write transactions which can require snoops requests. This requirement of prevents the write channel from ever stalling due to snoop requests when a memory update writeback is issued.

Figure 8:
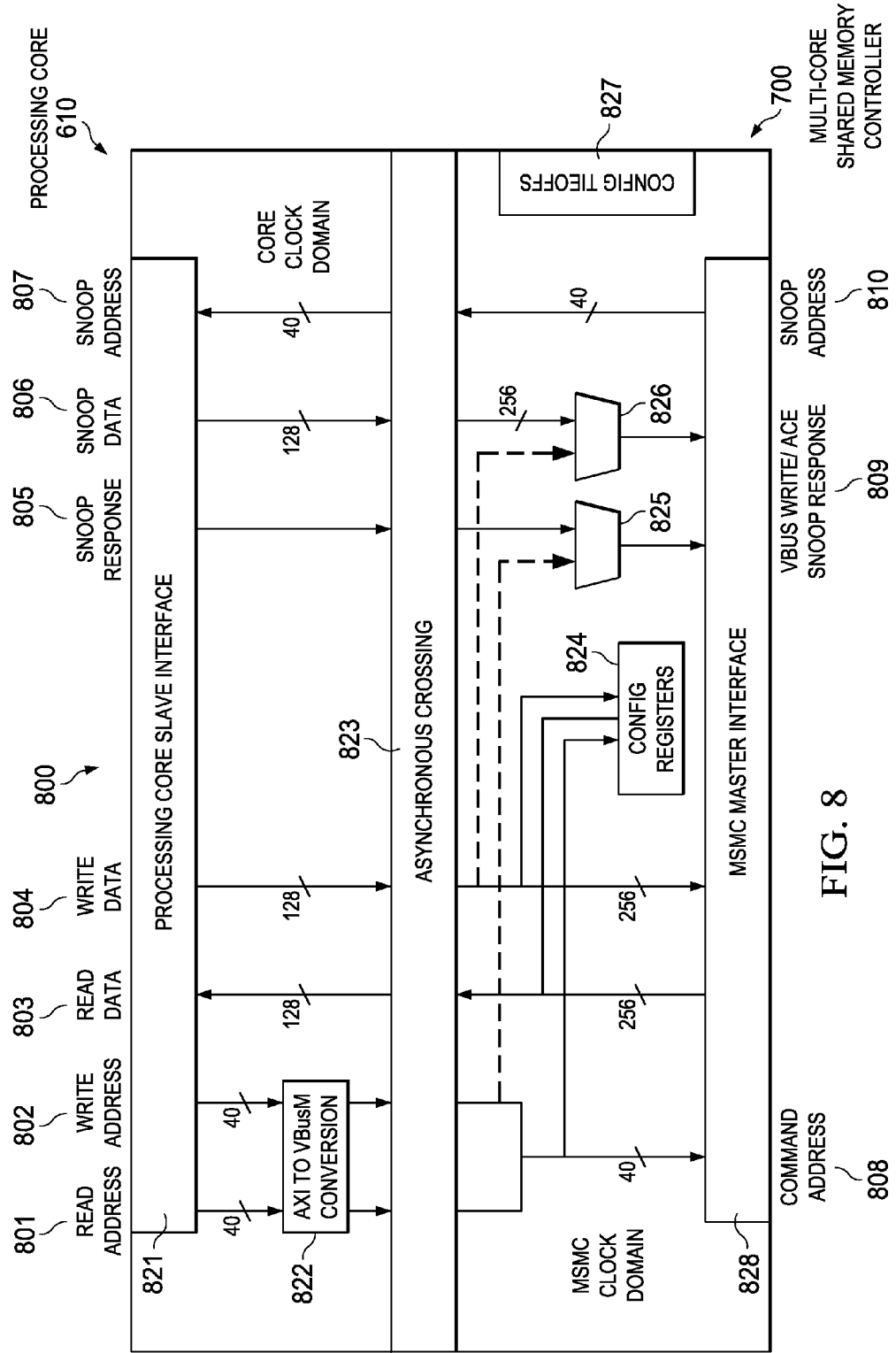
FIG. 8 illustrates an interface between one of the processing cores and the multi-core shared memory controller.

FIG. 8 illustrates an interface 800 between one of the processing cores 610 and multi-core shared memory controller 700. Processing core slave interface 821 connects to processing core 610 via: read address bus 801; write address bus 802 read data bus 803; write data bus 804; snoop response bus 805; snoop data bus 806 and snoop address bus 807. Processing core slave interface 821 responses to processing core 610 as a slave and provides all the handshake and signal information needed for communication with processing core 610 as a slave.

Processing core slave interface 821 supplies the read address and the write address to bus converter 822. As shown in FIG. 8 bus converter 822 preferably converts addresses between an ARM™ AXI bus and a VBusM. The ARM™ AXI has separate channels for read and write transactions. Interface 800 merges the AXI read and write channels onto the single VBusM R/W Command channel via bus converter 822. This merge introduces a possibility that coherent reads can block a following memory update writeback if the coherent read triggered a snoop of other processing cores.

The memory update writes that do not trigger snoops are WriteBack and WriteClean. The coherent writes that may trigger snoops are WriteUnique and WriteLineUnique. A snoop filter in the interconnect allows snooping to be done only when necessary by tracking cache line ownership by all coherent masters. Without a snoop filter, a basic interconnect must snoop all coherent masters for every coherent transaction. This can be inefficient. In the invention multi-core shared memory controller 700 includes this snoop filter as a part of overall coherency support.

The converted read and write addresses as well as the read data, write data, snoop response, snoop data and snoop address pass between clock domains via asynchronous crossing 823. Configuration registers 824 is readable and writeable by processing core 610 via respective read address 801/read data 803 and write address 802/write data 804. Multiplexer 825 selects either the write address or the snoop response to transmit to multi-core shared memory controller 700. Multiplexer 826 selects either the write data or the snoop data to transmit to multi-core shared memory controller 700. Configuration tieoffs 827 enable semi-permanent configuration setting via integrated circuit pin connections.

MSMC master interface 828 controls communication multi-core shared memory interface 700 as a master. MSMC master interface 828 provides all the handshake and signal information needed for communication with multi-core shared memory interface 700 as a master.

Instead of creating an entirely separate VBusM Master Interface for all write transactions, interface 800 moves the WriteBack, WriteClean, WriteNoSnoop, and Evict coherent write transactions onto new VBusM Master Interface. MSMC master Interface 828 shares its datapath with the existing Snoop Response/Snoop Data Master Interface. The write transactions WriteUnique and WriteLineUnique remain on the original VBusM Master Interface.

Interface 800 transmits either a VBus write command or a snoop response, never both. Data transfers are sent to MSMC 700 in the same order as the issued VBus writes and the snoop responses. Furthermore, there is only one data bus 809 on interface 800 for write data and snoop data.

Figure 9:
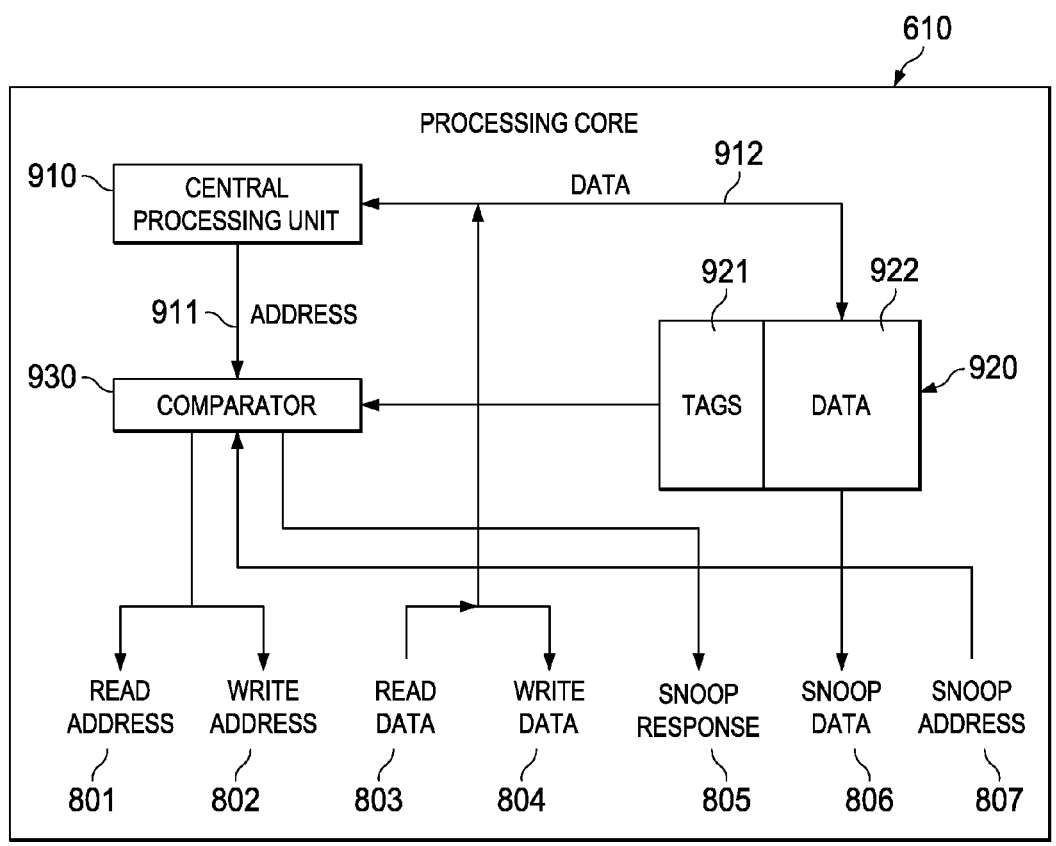
FIG. 9 illustrates relevant parts of a processing core which couples with the interface illustrated in FIG. 9 in accordance with this invention.

FIG. 9 illustrates relevant parts of a processing core 610 which couples with interface 800 in accordance with this invention. Central processing unit 910 performs programmed data processing operations including data read and data write commands. On a date read command central processing unit 910 supplies an address 911 to comparator 930. Comparator 930 compares this address with each address tag 921 within cache 920. If a match is found, cache 920 supplies data from the corresponding cache line in data section 922. If no match is found, processing core 610 supplies the address 911 on read address bus 801. Multi-core shared memory controller 700 recalls data corresponding to address 911 from a higher level cache or shared memory. Multi-core shared memory controller 700 supplies this data to processing core 601 via read data bus 803. On a date write command central processing unit 910 supplies an address 911 to comparator 930. Comparator 930 compares this address with each address tag 921 within cache 920. If a match is found, write data 912 from central processing unit 910 to cache 920 for storage in the corresponding cache line in data section 922. If no match is found, processing core 610 supplies the address 911 on write address bus 802. Multi-core shared memory controller 700 receives the write data 912 on write data bus 804. Multi-core shared memory controller 700 stores this data in a higher level cache or shared memory.

A coherence write by another processing core 610 may cause multi-core shared memory controller 700 to initiate a snoop cycle. MSMC 700 supplies a snoop address to processing core 610 via snoop address bus 807. Comparator 930 compares this snoop address with each address tag 921 within cache 920. There are three possible snoop responses. If no match is found, then cache 920 does not store this data. Processing core 610 transmits a Not Cached signal on snoop response bus 805. If a match is found, then cache 920 does stores this data. Comparator 930 then determines from dirty cache tags whether this data has been changed by central processing unit 910 since the last write to higher level memory. If the whole cache line is clean, then processing core 610 transmits a Cached and Clean signal on snoop response bus 805. Processing core 610 does not need to supply any data on snoop data bus 806 for a Not Cached or a Cached and Clean signal snoop response. If any of the cache line is dirty, then processing core 610 transmits a Cached and Dirty signal on snoop response bus 805. Processing core 610 transmits the cache line and the corresponding dirty tags on the snoop data bus 806. MSMC 700 is responsible for any coherence operations required by the Cached and Dirty response.

Snoop responses always take priority over write commands on interface 800 because the originating read or write operation trigging a snoop transaction has been in the system much longer than a write command originating from a coherent master.

What is claimed is:

1. An interface between a multi-core shared memory controller and one of a plurality of processing cores comprising:
   a read address bus adapted for receiving a read address from the processing core;
   a read data bus adapted for supplying read data from the interface to the processing core;
   a write address bus separate from said read address bus adapted for receiving a write address from the processing core;
   a write data bus separate from said read data bus adapted for supplying write data from the processing core to the interface;
   a snoop response bus adapted for supplying a snoop response signal from the processing core to the interface;
   a snoop data bus separate from said read data bus and from said write data bus adapted for supplying snoop data from the processing core to the interface;
   a first snoop address bus separate from said read address bus and from said write address bus adapted for supplying a snoop address from the interface to the processing core;
   a command address bus adapted for supplying one of a read data address from the processing core or a write data address from the processing core to the multi-core shared memory controller;
   a data bus adapted for one of (1) receiving read data from the multi-core shared memory controller, (2) supplying write data to the multi-core shared memory controller or (3) supplying snoop response data from the processing core to the multi-core shared memory controller; and
   a second snoop address bus separate from said first snoop address bus adapted for receiving a snoop address from the multi-core shared memory controller.

2. The interface of claim 1, further comprising:
   a bus converter connected to said read address bus, said write address bus and said command address bus for converting said read address and said write address from the processing core from a first bus protocol to a second bus protocol supplied to said command address bus.

3. The interface of claim 1, further comprising:
   an asynchronous crossing unit connecting a first clock domain including said read address, said write address, read data, said write data, said snoop response, said snoop data and said first snoop address from the processing core to a second clock domain including said command address, said data bus and said second snoop address.

* * * * *